Figure 1:
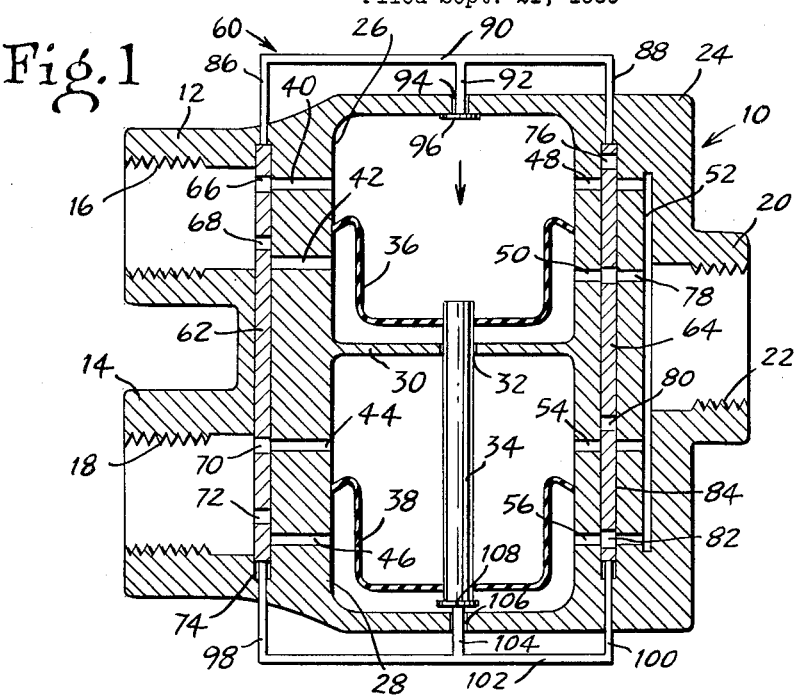

May 8, 1962 R. H. CALLEN 3,033,218
FLUID PROPORTIONER
Filed Sept. 21, 1959

INVENTOR
Robert H. Callen,
BY Diggins & LeBlanc
ATTORNEYS

United States Patent Office 3,033,218
Patented May 8, 1962

3,033,218
FLUID PROPORTIONER
Robert H. Callen, Bay Shore, N.Y., assignor to Fairchild Stratos Corporation, a corporation of Maryland
Filed Sept. 21, 1959, Ser. No. 841,365
10 Claims. (Cl. 137—99.5)

This invention relates to a fluid proportioning device and more particularly to a fluid proportioner particularly suited for use in providing a proportional flow of liquid fuel from a plurality of fuel tanks to an engine.

A wide variety of devices are known for both dividing and combining liquids or gases in desired proportion for feeding either from or to a plurality of tanks. The known proportioners, however, either tend to be unreliable in operation or involve a rather complex construction involving biasing means such as a spring, are inherently limited to one-way operation, or do not operate equally well with both liquids and gases.

The present invention provides a novel fluid proportioner substantially improving over known constructions. The proportioner of the present invention is of relatively simple construction, inexpensive to manufacture, has relatively few moving parts and operates with increased reliability and longer wear. As shown, only a minimum of simple seals need be employed.

The device of the present invention is capable of operation with both liquids and gases of any of a wide variety and types. While the invention will be described in conjunction with an embodiment utilized in the delivery of liquid fuel from a pair of tanks to a single point of utilization such as an aircraft engine it is apparent that the invention contemplates the device for use as a fluid divider wherein a single source of fluid supplies a plurality of output conduits.

As is well known, aircraft engines conventionally receive a supply of fuel from more than one fuel tank. In order to maintain the proper weight distribution throughout the aircraft and to avoid the necessity for switching from one tank to another it is customary to utilize a fuel proportioner wherein the fuel is delivered to the aircraft engine from separate tanks in proportion to the capacity or amount of fuel in each tank. The present invention relates to a fuel proportioner of this type suitable for connection into the flow line from two or more tanks wherein the fuel may be delivered to the engine in proportion to the capacity of each tank.

It is therefore a primary object of the present invention to provide an improved fluid proportioner.

Another object of the present invention is to provide a fluid proportioner particularly suited for use in proportioning liquid fuel.

Another object of the present invention is to provide a fluid proportioner for automatically separating or combining fluids which requires no permanent biasing means such as springs or the like.

Figure 2:
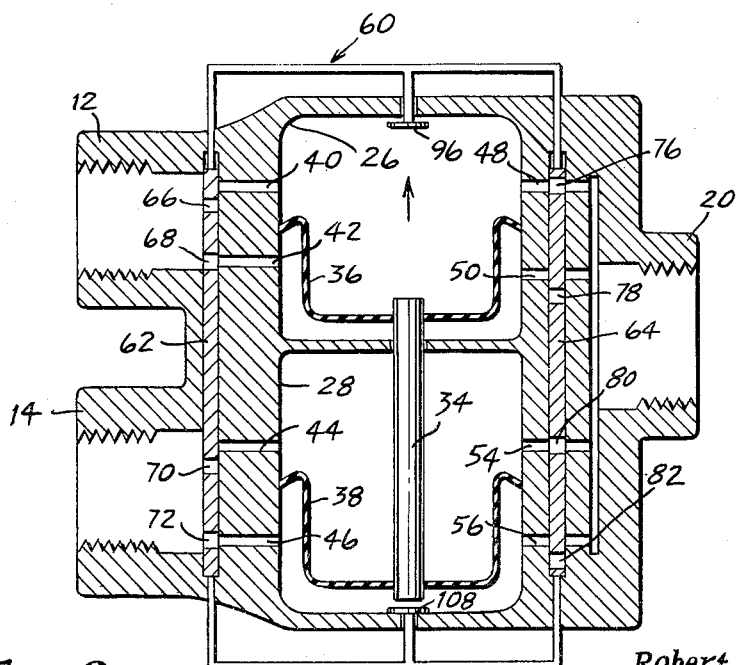

These and other objects and advantages of the invention will be more apparent upon reference to the following specification, claims and appended drawings wherein:

FIGURE 1 is a partial cross-section through a proportioner constructed in accordance with the present invention; and FIGURE 2 s a similar partial cross-section during a subsequent quarter cycle of operation from that shown in FIGURE 1, wherein the proportioner piston is moving in the opposite direction.

Referring to the drawngs, FIGURE 1 illustrates the novel fluid proportioner of the present invention, generally indicated at 10, comprising a pair of inlet conduits 12 and 14 suitably threaded at 16 and 18 for connection to the output lines from a pair of aircraft fuel tanks. While only two such connections are shown, it will be understood that the present invention is equally suited for use with two or more input lines and that any reasonable number may be employed with equal facility. On the opposite side of the proportioner 10 is an outlet conduit 20 threaded at 22 for connection to the fuel input line of an aircraft engine.

Conduits 12, 14 and 20 are all formed in the proportioner housing 24 which includes a pair of proportioning chambers 26 and 28 adapted to communicate with both the inlet and outlet passages through the proportioner. Chambers 26 and 28 are separated by a solid partition 30 forming an integral portion of the housing 24.

Formed in the center of partition 30 is an aperture 32 slidably receiving a central shaft or piston 34 which extends into each of the chambers 26 and 28. The piston or plunger 34 is formed to reciprocate in the aperture 32 and any suitably sealing means (not shown) may be provided for sealing chamber 26 from chamber 28 so that no fluid may escape from one chamber into the other.

Receiving in each of the chambers 26 and 28 are flexible diaphragms 36 and 38 respectively secured to the inner wall of each of the chambers around its entire periphery and also secured at its inner edge to the respective end of shaft 34. In this way the diaphragms 36 and 38 serve to divide chambers 26 and 28 into two separate fluid tight compartments which are alternately expanded and contracted in conjunction with the reciprocation of piston 34 in a manner more fully described below.

Communicating with chamber 26 are a pair of fluid inlet passages 40 and 42 which provide fluid communication between the inlet conduit 12 and the chamber 26 in opposite sides of the diaphragm 36. Similarly fluid passages 44 and 46 connect the opposite sides of diaphragms 38 to the inlet conduit 14. Passages 48 and 50 connect opposite sides of diaphragm 36 to the outlet conduit 20 by way of an elongated chamber 52 and outlet passages 54 and 56 similarly connected opposite sides of diaphragm 38 to the elongated chamber 52 and hence to the outlet conduit 20.

The proportioner 10 of the present invention includes a valving assembly generally indicated at 60 comprising input and output valve plates 62 and 64 for closing off selected ones of the nput and output passages to effect a proportioning of the fluid flowing through the proportioner. Valve plate 62 is provided with valve apertures 66 and 68 alternately establishing communication with chamber 28 and with opposite sides of diaphragm 36 and further includes two lower valve apertures 70 and 72 alternately establishing communication with chamber 28 and the opposite sides of flexible diaphragm 38. As shown, valve plate 62 is constructed in the form of a plate of any suitable elongated configuration adapted to slide a short distance in up and down movement in a vertical slot 74 in which it is received.

Output valve plate 64 includes upper valve apertures 76 and 78 establishing alternate communication between outlet conduit 20 and chamber 26 on opposite sides of flexible diaphragm 36. A pair of lower apertures 80 and 82 establish alternate communication between the outlet conduit and chamber 28 on opposite sides of flexible diaphragm 38. Outlet valve plate 64 is similarly slidably received in an elongated vertical slot 84 and is adapted to reciprocate in a vertical direction within the slot.

The two valve plates 62 and 64 are joined by a framework forming an additional portion of the valve assembly and including a pair of upper vertical legs 86 and 88 joined by a horizontal cross bar 90. Depending from cross bar 90 is a central plunger bar 92 slidably received in an aperture 94 formed in one end of the housing 24 and located centrally of one end of the chamber 28. Plunger bar 92 terminates in a plunger plate 96 which also acts as a stop for the reciprocating motion of the plunger bar 92 in the aperture 94. Suitable sealing means (not shown) may be provided for sealing the aperture 94 against the escape of fluid from chamber 28. The lower ends of legs 86 and 88 are rigidly secured to the upper ends of the valve plates 62 and 64.

The lower ends of valve plates 62 and 64 are similarly rigidly secured to a pair of upwardly extending vertical legs 98 and 100 joined by a horizontal cross bar 102. An upwardly extending plunger bar 104 is slidably received in suitable fluid tight relation in an aperture 106 in alignment with aperture 94 and formed in the opposite end of the housing 24. Plunger bar 104 terminates in a plunger plate 108 similar to the plunger plate 96.

As can be seen the impingement of first one end and then the other end of plunger 34 against one of the plunger plates 96 and 108 serves to move the entire valve assembly including the framework and valve plates a short distance upwardly and downwardly so as to vary the communication between the inlet and outlet conduits and the respective chambers.

FIGURE 1 illustrates the valving arrangement utilized when the proportioner acts to deliver fluid from a multiple source to a single utilization point such as from a plurality of fuel tanks to the engine of an aircraft. With the plunger 34 moving downward in the direction of the arrow indicated in FIGURE 1 the valve plates 62 and 64 are in their uppermost positions in their respective slots 74 and 84. In the uppermost position of inlet valve plate 62, aperture 66 establishes communication between the inlet conduit 12 and inlet passage 40 to the upper side of diaphragm 36. Similarly aperture 70 establishes communication between inlet conduit 14 and the upper side of flexible diaphragm 38. Fluid pressure causes the diaphragms to move downwardly as shown and to drive piston 34 along with them in a downward direction toward plunger plate 108. Apertures 68 and 72 are displaced from passages 44 and 46 so that no inlet fluid is supplied to the lower halves of chambers 26 and 28 on the lower sides of flexible diaphragms 36 and 38, when the piston 34 is moving in the downward direction. At the same time, outlet valve plate 64 is in its uppermost position so that communication is established through aperture 78 and passage 50 and through aperture 82 and passage 56 to establish fluid communication between the underside of the flexible diaphragms and the outlet conduit 20. Apertures 76 and 80 are displaced from passages 48 and 54 so that the outlet passages on the upper sides of the diaphragms are closed.

Upon reaching its downwardmost position the piston 34 impinges upon lower plunger plate 108 and drives the plunger plate 108 downwardly until it impinges upon the lower wall of chamber 28 in the position shown in FIGURE 2 of the drawings. This driving action against plunger plate 108 moves the entire valve assembly including the valve plates 62 and 64 into the position shown in FIGURE 2 wherein communication of inlet fluid with the upper halves of the chambers is now cut off and the communication between the inlet conduits and the lower sides of the flexible diaphragms established. As can be seen in FIGURE 2 valve aperture 66 is no longer in alignment with passage 40 but valve aperture 68 is now brought in alignment with inlet passage 42. Similarly inlet valve aperture 70 is moved away from passage 44 while the aperture 72 is now in alignment with passage 46. In this way, fluid pressure brought about by fluid entering from conduits 12 and 14 tends to drive the diaphragms 36 and 38 along with piston 34 in the upward direction as indicated by the arrow in FIGURE 2.

At the same time, since the entire valve assembly has moved in the downward direction communication between the outlet conduit and the uppersides of the flexible diaphragms is established. As can be seen valve aperture 76 is now in alignment with passage 48 and valve aperture 80 is in alignment with passage 54. On the other hand, valve apertures 78 and 82 are displaced from the passages 50 and 56 so as to close off the lower halves of the chambers from the outlet conduit 20. The movement of the entire valve assembly also acts to cause plunger plate 96 to extend further into the chamber 26 so that upward movement of the piston 34 will eventually bring it into engagement with the plunger plate 96 to move the entire assembly in the upward direction so as to begin the next succeeding cycle of operation. The plunger plates 96 and 108 are enlarged so as to act as stops against the inner walls of the chambers to limit the upward and downward movement of the entire valve assembly including the valve plates 62 and 64.

The delivery of fluid from the inlet to the outlet occurs continuously during each half cycle of operation with the fluid being expelled from both chambers, first from the one side of the respective diaphragms and then from the opposite sides of the respective diaphragms. The amount of fluid delivered, for example, from inlet conduit 12 to outlet conduit 20 is dependent upon and proportional to the volume of chamber 26 with which the inlet conduit communicates. Similarly the volume of fluid delivered from inlet conduit 14 to outlet conduit 20 is dependent upon and proportional to the volume of chamber 28 with which it communicates. If the chamber 26 and 28 are constructed to be of equal volume equal quantities of fluid will be delivered to the outlet conduit 20 from each of the inlet conduits 12 and 14. However, if the chambers 26 and 28 are provided with different volumes the amount of fluid delivered from the conduit communicating with the particular chamber whose size had been varied will in turn be modified accordingly. The delivered fluid during each cycle is, of course, physically determined by the displacement of the diaphragm within the chamber and hence the size of the chamber itself. As shown in the drawings the diaphragms are preferably secured to the walls of each chamber approximately midway of its ends.

Although the proportioner of the present invention has been described as delivering fluids from a plurality of sources to a single utilization station it is readily apparent that the direction of flow may be reversed so that the proportioner acts as a fluid divider with fluid entering the conduit 20 being divided between conduits 12 and 14 in proportion to the volume of chambers 26 and 28 respectively. In order to bring about this reversal of flow it is only necessary that the valve plates 62 and 64 be modified accordingly to establish simultaneous communication with the chambers on opposite sides of the diaphragms when the direction of movement of the piston 34 is reversed. Similarly while the operation has been described with respect to liquids and more particularly with respect to aircraft engine fuels it is to be understood that the proportioner of the present invention operates with equal facility in conjunction with both liquids and gases.

It is apparent from the above that the present invention provides a novel fluid proportioner of relatively simple inexpensive construction which completely avoids the necessity of any complex seal or permanent biasing means such as springs or the like. The proportioner automatically accommodates itself to the rate of fluid impinging upon it so that the fluid delivery is for all practical purposes substantially unimpaired by the insertion of the proportioner of the present invention into the fluid flow lines. A simple modification of the proportioner of the present invention makes it suitable for use as either a combining or mixing unit on the one hand or as a dividing unit on the other hand. Although described as usable with only a single fluid it will be apparent that the device may be utilized to mix different types of fluids and for example to mix liquids with gases. Furthermore, while only two inlet conduits and two diaphragm chambers are shown it is apparent that any number may be employed without modifying the operation of the device.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid proportioner comprising at least two fluid tight chambers, a flexible diaphragm dividing each of said chambers into two fluid tight compartments, means connecting the movable portions of said diaphragms for uniform movement under the influence of a pressure differential across said diaphragms, means for simultaneously introducing pressure fluid on one side of each of said diaphragms to cause movement of said diaphragms in the same direction, means for simultaneously introducing pressure fluid to the other sides of said diaphragms, means for connecting the low pressure side of said diaphragms to a fluid outlet, and means responsive to movement of said diaphragms for alternating the introduction of pressure fluid between said sides of said diaphragms whereby the volume of fluid flowing through each of said chambers is proportional to the size of said chamber.

2. A fluid proportioner according to claim 1 wherein said means connecting the movable portions of said diaphragms comprises a piston having one of said diaphragms connected to each end.

3. A fluid proportioner comprising at least two fluid tight chambers, a flexible diaphragm having its outer edges connected to the inner walls of each of said chambers, a piston slidably mounted between said chambers with each end received in one of said chambers, said diaphragms having their inner edges connected to opposite ends of said piston to divide each of said chambers into separate fluid tight compartments, means for simultaneously introducing pressure fluid on one side of each of said diaphragms to cause movement of said diaphragms in the same direction, means for simultaneously introducing pressure fluid to the other side of said diaphragms, means for connecting the sides of said diaphragms remote from said sides to which said pressure fluid is introduced to a fluid outlet, and means coupled to said piston and responsive to movement of said diaphragms for alternating the introduction of pressure fluid between said sides of said diaphragms whereby the volume of fluid flowing through each of said chambers is proportional to the size of said chamber.

4. A fluid proportioner according to claim 3 wherein said fluid outlet is a common conduit for all of said chambers.

5. A fluid proportioner according to claim 3 wherein said opposite compartments in each of said chambers are of approximately equal size when said diaphragms are not stressed.

6. A fluid proportioner according to claim 3 wherein said chambers are of different size.

7. A fluid proportioner according to claim 3 wherein said means for alternating the introduction of pressure fluid to said chambers comprises a valve plate coupled to and movable with said piston.

8. A fluid proportioner according to claim 7 wherein said means for connecting the remote sides of said diaphragms to a fluid outlet comprises a second set of valves coupled to and movable with said piston.

9. A fluid proportioner comprising at least two fluid tight chambers, a flexible diaphragm having its outer edges connected to the inner walls of each of said chambers, a piston slidably mounted between said chambers with each end received in one of said chambers, said diaphragms having their inner portions connected to opposite ends of said piston to divide each of said chambers into separate fluid tight compartments, means for simultaneously introducing pressure fluid on one side of each of said diaphragms to cause movement of said diaphragms in the same direction, means for simultaneously introducing pressure fluid to the other sides of said diaphragms, means for alternating the introduction of pressure fluid to said compartments comprising a valve plate connected through lost motion coupling means to said piston, and means for connecting the side of said diaphragms remote from the side to which said pressure fluid is introduced to a fluid outlet, said connecting means comprising a second valve plate connected through lost motion means to said piston, said valve plates moving between open and closed positions with said piston during the final portion of its stroke in each direction.

10. A fluid positioner according to claim 9 wherein said lost motion means comprises a plunger plate adjacent each end of said piston and engageable by the piston during a portion of its stroke, said plunger plates being rigidly secured to the ends of said valve plates whereby said valve plates are moved by said piston during the latter part of its stroke in each direction.

References Cited in the file of this patent

UNITED STATES PATENTS

| | | |
|---|---|---|
| 335,855 | Toole | Feb. 9, 1886 |
| 688,598 | Coryell | Dec. 10, 1901 |
| 2,592,940 | Monoyer | Apr. 15, 1952 |

FOREIGN PATENTS

| | | |
|---|---|---|
| 326,933 | France | Mar. 10, 1903 |